(12) United States Patent
Aihara

(10) Patent No.: US 6,842,536 B2
(45) Date of Patent: Jan. 11, 2005

(54) IMAGE PROCESSING APPARATUS, IMAGE PROCESSING METHOD AND COMPUTER PROGRAM PRODUCT FOR CORRECTING IMAGE OBTAINED BY SHOOTING SUBJECT

(75) Inventor: Nobuhiro Aihara, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 658 days.

(21) Appl. No.: 09/955,940

(22) Filed: Sep. 20, 2001

(65) Prior Publication Data

US 2002/0037101 A1 Mar. 28, 2002

(30) Foreign Application Priority Data

Sep. 26, 2000 (JP) ........................................ 2000-292134

(51) Int. Cl.[7] .............................. G06K 9/00; G03F 3/08
(52) U.S. Cl. ....................................... 382/167; 358/520
(58) Field of Search ................................ 382/162, 164, 382/167, 168, 171, 173, 262, 264; 345/597, 600, 604; 358/515, 518, 520, 522, 523, 530; 348/207, 222, 599, 603, 606

(56) References Cited

U.S. PATENT DOCUMENTS

| | | | | |
|---|---|---|---|---|
| 4,945,406 A | * | 7/1990 | Cok | ........................... 358/506 |
| 5,038,216 A | * | 8/1991 | Easterly et al. | ............ 348/364 |
| 5,715,377 A | | 2/1998 | Fukushima et al. | |
| 5,805,213 A | * | 9/1998 | Spaulding et al. | ....... 348/222.1 |
| 6,028,957 A | | 2/2000 | Katori et al. | |
| 6,211,973 B1 | * | 4/2001 | Takemoto | ................... 358/515 |
| 6,243,133 B1 | * | 6/2001 | Spaulding et al. | ....... 348/223.1 |
| 6,424,740 B1 | * | 7/2002 | Giorgianni et al. | ......... 382/167 |
| 6,594,388 B1 | * | 7/2003 | Gindele et al. | ............ 382/167 |
| 6,628,823 B1 | * | 9/2003 | Holm | ......................... 382/162 |
| 6,763,176 B1 | * | 7/2004 | Trottier et al. | ................ 386/52 |

FOREIGN PATENT DOCUMENTS

JP 9-247473 9/1997

* cited by examiner

Primary Examiner—Andrew W. Johns
Assistant Examiner—Amir Alavi
(74) Attorney, Agent, or Firm—Burns, Doane, Swecker & Mathis, L.L.P.

(57) ABSTRACT

To correct an image obtained by shooting a subject by a digital camera or the like, an image processing apparatus includes a color space transformation processing portion receiving the image and transforming the received image into a color signal represented in a uniform color space, a scene determination processing portion determining scene information indicating a character of the image, a noise eliminating filter deciding portion deciding a noise eliminating filter used for correcting the image according to the determined scene information, and a noise elimination processing portion correcting the image in the uniform color space according to the decided noise eliminating filter. The correction level is decided according to the scene information indicating the character of the image, allowing correction to be performed only as required according to the received image. The image is corrected in the uniform color space, preventing blurred image while gradation of the image is maintained.

13 Claims, 6 Drawing Sheets

| 1/16 | 1/8 | 1/16 |
|---|---|---|
| 1/8 | 1/4 | 1/8 |
| 1/16 | 1/8 | 1/16 |

FIG. 4B

| 1/32 | 1/16 | 1/32 |
|---|---|---|
| 1/16 | 5/8 | 1/16 |
| 1/32 | 1/16 | 1/32 |

IMAGE PROCESSING APPARATUS, IMAGE PROCESSING METHOD AND COMPUTER PROGRAM PRODUCT FOR CORRECTING IMAGE OBTAINED BY SHOOTING SUBJECT

This application is based on application No. 2000-292134 filed in Japan, the content of which is hereby incorporated by reference.

BACKGROUND OF THE INVENTION

1. Field of the Invention

The present invention relates to an image processing apparatus, an image processing method and a computer program product, and more particularly, to an image processing apparatus, an image processing method and a computer program product that correct an image obtained by shooting a subject by a digital camera or the like.

2. Description of the Related Art

An image shot by a digital camera or the like and an image read by an image scanner or the like may sometimes contain noise. A charge coupled device (CCD) is often used in a digital camera or a scanner as a photoelectronic converting element. A CCD has a property such that it becomes less sensitive as an amount of light is reduced. Thus, a large amount of noise such as color irregularity may occur in a dark region of a shot image when, for example, a subject is shot in a backlighted state. Though the noise occurred in the dark region is not highly visible because of low lightness, it comes to be visible when the image is subjected to a correction process for enhancing the lightness.

Moreover, an image obtained by shooting a blue sky or the like includes a large region having the same hue. The noise in lightness is highly visible in the large region across which the same hue extends. Furthermore, it is desirable to eliminate noise in an image obtained by shooting a human face in order to finely compensate the image of the human face.

In order to eliminate such noise, a correction process for eliminating noise using a smoothing filter or a median filter is performed on each of R (red), G (green) and B (blue) components.

Moreover, in Japanese Patent Laying-Open No. 9-247473 (corresponding to U.S. Pat. No. 6,028,957) proposes a noise elimination process in which image data represented by color components of R, G and B is transformed into color signals on a uniform color space that is more appealing to human sense, and a smoothing filter is used for each color signal. The uniform color space used here is defined by three components of lightness, hue and chroma. According to this method, loss of image data and remaining of noise can be reduced compared to the case where a smoothing process is performed on each of the R, G and B components.

However, when the noise elimination process using the smoothing filter is uniformly performed on all of the R, G and B components, a flat image having poor gradation may disadvantageously be produced. In addition, even if the noise elimination process is uniformly performed on all the color signals of lightness, hue and chroma, the lightness, hue and chroma components are uniformly made smooth, also resulting in a flat image with poor gradation.

Each of the color signals of lightness, hue and chroma has a different property for each component. The chroma and lightness components are, respectively, indicators for simply indicating levels of the chroma and lightness, while the hue component is an indicator for indicating a color. Thus, if the correction process using a smoothing filter is uniformly performed on all the components as in the case with Japanese Patent Laying-Open No. 9-247473, the entire image is uniformly subjected to weight averaging.

For example, when a red pixel and a blue pixel are adjacent to each other, a neutral color which is an average of red and blue may occur due to a correction process for the hue component. In order to prevent occurrence of such unwanted neutral color, it may be considered that, for example, a median filter is uniformly provided for all the components. However, this also results in a flat image having poor gradation overall.

SUMMARY OF THE INVENTION

The present invention is made to solve the problems described above, and an object of the present invention is to provide an image processing device and an image processing method that can appropriately correct an image.

Another object of the present invention is to provide a computer program product making a computer execute an image processing that can appropriately correct an image. The computer program product includes a program itself as well as a recording medium in which the program is recorded.

In order to achieve the objects described above, according to one aspect of the present invention, an image processing apparatus includes a receiver to receive an image obtained by shooting a subject; a transforming portion to transform the received image into a color signal represented in a uniform color space; a determining portion to determine scene information indicating a character of the received image; a deciding portion to decide a correction level for correcting the image in accordance with the determined scene information; and a correcting portion to correct the image in the uniform color space in accordance with the decided correction level.

According to the present invention, the correction level is decided in accordance with the scene information indicating the character of the image, so that correction is made only as required in accordance with the received image. Moreover, the image is corrected in the uniform color space, preventing the image from wholly being blurred while gradation of the image is maintained. As a result, an image processing apparatus that is able to appropriately correct an image can be provided. The uniform color space includes color spaces represented by color systems such as the Munsell color system, L*a*b* color system, L*u*v* color system, CIE color system, DIN system, and Ostwald color system.

According to another aspect of the present invention, an image processing apparatus includes a receiver to receive an image obtained by shooting a subject; a dividing portion to divide the received image into a plurality of rectangular regions; a transforming portion to transform the received image into a color signal represented in a uniform color space; a detecting portion to detect an attribute of each of the plurality of rectangular regions based on the transformed color signals; a deciding portion to decide a correction level for each of the rectangular regions in accordance with the detected attribute of each of the rectangular regions; and a correcting portion to correct the received image for each of the rectangular regions in the uniform color space, in accordance with the decided correction level.

According to the present invention, the level of correcting the image is partially changed, so that the image can be partially corrected to be adapted to a partial character of the image. As a result, an image processing apparatus that is able to appropriately correct an image can be provided.

According to a further aspect of the present invention, an image processing method includes the steps of receiving an image obtained by shooting a subject; transforming the received image into a color signal represented in a uniform color space; determining scene information indicating a character of the received image; deciding a correction level for correcting the image in accordance with the determined scene information; and correcting the image in the uniform color space in accordance with the decided correction level.

According to the present invention, the correction level is decided in accordance with the scene information indicating the character of the image, so that correction is made only as required in accordance with the received image. Moreover, the image is corrected in the uniform color space, preventing the image from wholly being blurred while gradation of the image is maintained. As a result, an image processing method that is able to appropriately correct an image can be provided.

According to a yet further aspect of the present invention, a computer program product makes a computer execute the steps of receiving an image obtained by shooting a subject; transforming the received image into a color signal represented in a uniform color space; determining scene information indicating a character of the received image; deciding a correction level for correcting the image in accordance with the determined scene information; and correcting the image in the uniform color space in accordance with the decided correction level.

According to the present invention, the correction level is decided in accordance with the scene information indicating the character of the image, so that correction is made only as required in accordance with the received image. Moreover, the image is corrected in the uniform color space, preventing the image from wholly being blurred while gradation of the image is maintained. As a result, a computer program product capable of making a computer execute an image processing that is able to appropriately correct an image can be provided.

According to a further aspect of the present invention, a computer program product makes a computer execute the steps of receiving an image obtained by shooting a subject; dividing the received image into a plurality of rectangular regions; transforming the received image into a color signal represented in a uniform color space; detecting an attribute of each of the plurality of rectangular regions based on the transformed color signal; deciding a correction level for each of the rectangular regions in accordance with the detected attribute; and correcting the received image for each of the rectangular regions in the uniform color space in accordance with the decided correction level.

According to the present invention, the level of correcting the image is partially changed, so that the image can be partially corrected to be adapted to a partial character of the image. As a result, a computer program product capable of making a computer execute an image processing that is able to appropriately correct an image can be provided.

According to a yet further aspect of the present invention, a computer program product makes a computer execute the steps of receiving an image obtained by shooting a subject; transforming the received image into a color signal represented in a uniform color space; determining scene information indicating a character of the received image; deciding process details for correcting the image in accordance with the determined scene information; and correcting the image in the uniform color space in accordance with the decided process details.

According to the present invention, process details for correction are decided in accordance with the scene information indicating the character of the image, so that correction is made only as required in accordance with the received image. Moreover, the image is corrected in the uniform color space, preventing the image from wholly being blurred while gradation of the image is maintained. As a result, a computer program product capable of making a computer execute an image processing that is able to appropriately correct an image can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described below with reference to the drawings. It is noted that the same reference characters in the drawings denote the same or corresponding members, and the description thereof will not be repeated.

First Embodiment

Figure 1:
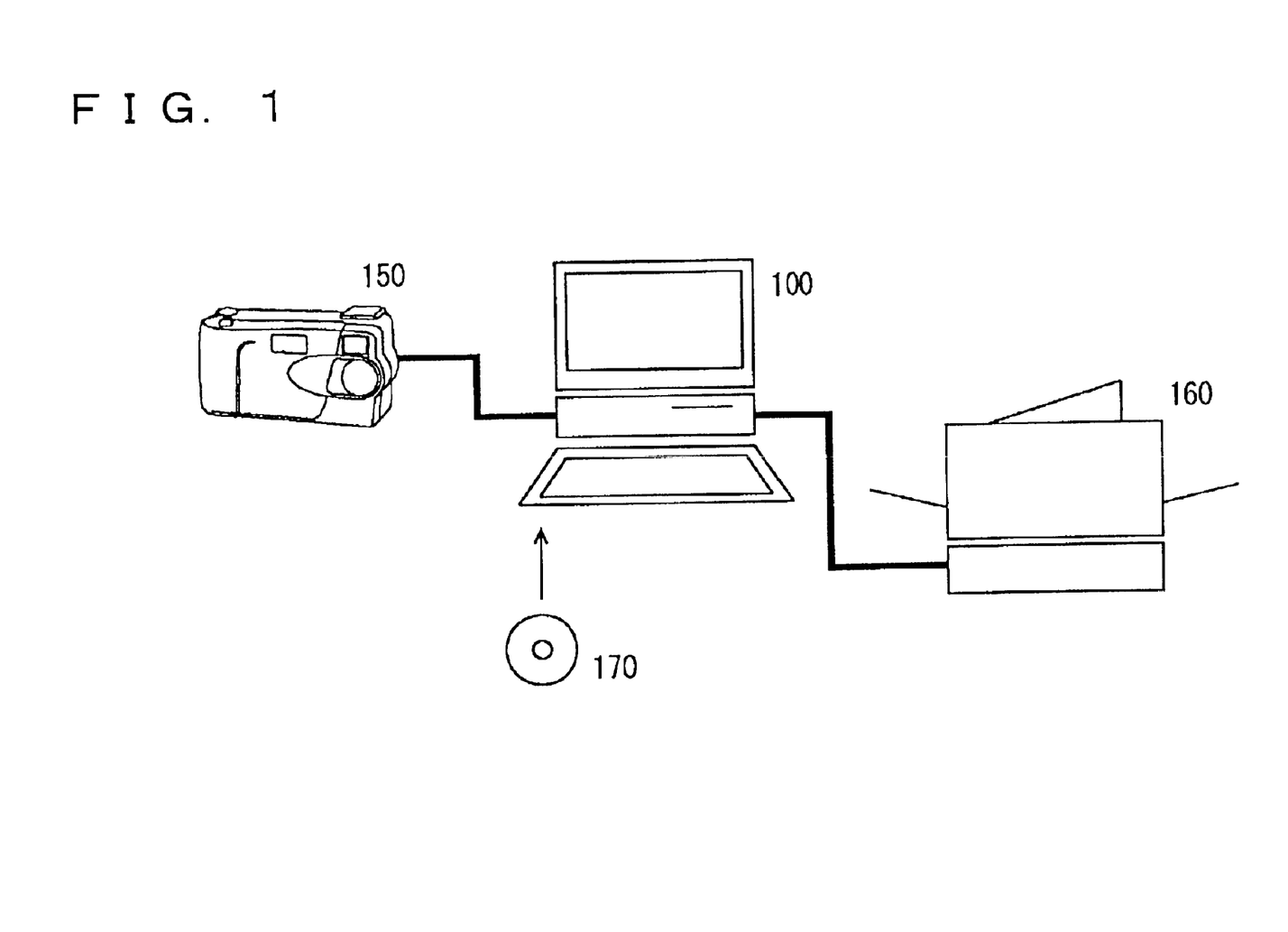
FIG. 1 shows a connection between an image processing apparatus according to the first embodiment of the present invention and external devices connected thereto.

FIG. 1 shows a connection between an image processing apparatus according to the first embodiment of the present invention and external devices connected thereto. Referring to FIG. 1, an image processing apparatus 100 is constituted by a personal computer. Image processing apparatus 100 is connected to an image input device 150 represented by a digital camera, and to an image output device 160 for outputting an image from image processing apparatus 100.

For image input device 150, a digital video camera, an image scanner or the like may also be used in place of the digital camera. The image that is input from the image input device into image processing apparatus 100 may be a still image or a motion image. In case of the motion image, an image processing similar to that for the still image is provided per frame in image processing apparatus 100.

Image output device 160 may be a laser printer or an ink-jet printer, and forms a full-color image onto a recording medium such as a sheet of paper.

Image processing apparatus 100 includes an external storage device and can read an image processing program to be executed in image processing apparatus 100 from a recording medium 170 such as a CD-ROM, a magneto-optical disk, a DVD (digital versatile disk), a flexible disk or the like. In this case, an image processing program for a noise elimination process, which will be described later, to be executed in image processing device 100 is recorded into recording medium 170. Then, the image processing program is read by the external storage device so as to be executable in image processing apparatus 100. The noise elimination process described below may also be performed in image input device 150.

Figure 2:
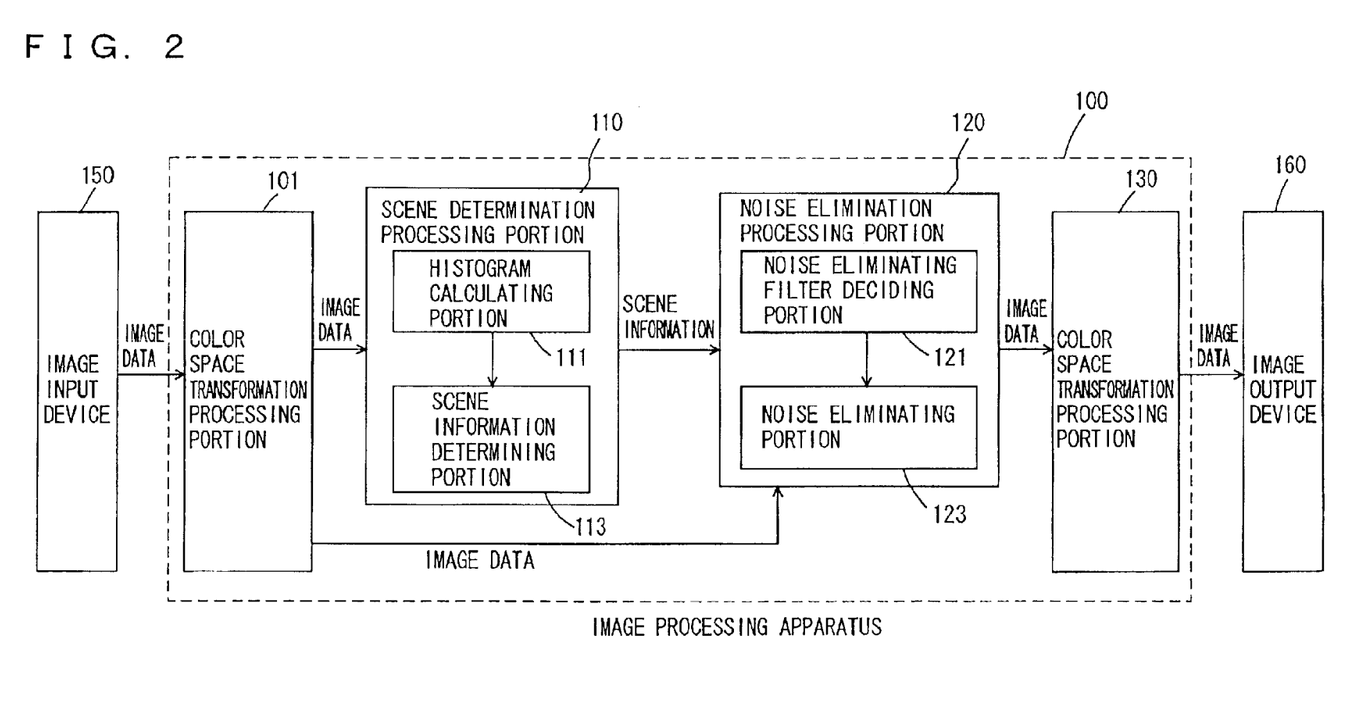
FIG. 2 is a functional block diagram schematically showing the function of the image processing apparatus according to the first embodiment.

FIG. 2 is a functional block diagram showing the outline of the function of the image processing apparatus according to the first embodiment. Referring to FIG. 2, image data including the respective components of R, G and B are transmitted from image input device 150 to image processing apparatus 100. Image processing apparatus 100 includes a color space transformation processing portion 101 transforming image data received from image input device 150 into data represented in a uniform color space; a scene determination processing portion 110 determining scene information of the image based on the image data transformed into data represented in the uniform color space; a noise elimination processing portion 120 eliminating noise from the image data transformed into the data represented in the uniform color space, based on the determined scene information; a color space transformation processing portion 130 transforming the image data represented in the uniform color space, from which noise is eliminated, into the image data represented in a color space defined by the R, G and B components.

Color space transformation processing portion 101 transforms the image data represented by the three components of R, G and B into data represented in the uniform color space defined by the three components of lightness, hue and chroma. The uniform color space in the Munsell color system is used for the uniform color space defined by the lightness, hue and chroma. It is noted that, though the Munsell color system is used here, the color space represented by color systems such as the L*a*b color system, L*u*v* color system, CIE color system, DIN system, and Ostwald color system may also be used.

Scene determination processing portion 110 includes a histogram calculating portion 111 calculating a histogram for each of the lightness, hue and chroma; and a scene information determining portion 113 determining scene information of the image data input from image input device 150 based on the calculated histogram. Histogram calculating portion 111 creates a histogram for each of the hue, chroma and lightness components, based on the image data transformed at color space transformation processing portion 101.

Scene information determining portion 113 determines scene information indicating the character of the image data, based on the three histograms created in histogram calculating portion 111. The scene information determined by scene information determining portion 113 is transmitted to noise elimination processing portion 120.

The scene information of the image indicates a scene at which an image is shot, and includes a shooting condition, an object to be shot, and so forth. The scene information includes an "underexposure image" indicating an underexposure shooting condition, a "sunset image" obtained by shooting a sunset view, a "backlighted image" indicating a backlight shooting condition, and a "blue sky image" in which a blue sky is a subject.

The scene information is determined using a lightness histogram, a hue histogram and a chroma histogram. The condition for determining the scene information as the "underexposure image" is that the distribution of the lightness histogram is biased in a low lightness region. The condition for determining the scene information as the "sunset image" is that the distribution of the lightness histogram is biased in the low lightness region and a high lightness region, and also the distribution of the hue histogram is biased in a region including the red to yellow components, and further the distribution of the chroma histogram is biased in a high chroma region overall. The condition for determining the scene information as the "backlighted image" is that the distribution of the lightness histogram is biased in the high and low lightness regions. The condition for determining the scene information as a "blue sky image" is that the hue histogram is biased toward the blue component. The bias in the distribution of each histogram is determined using mean, median, variance, maximum, and minimum.

Noise elimination processing portion 120 includes a noise eliminating filter deciding portion 121 applying a filter for eliminating noise for each of the lightness, hue and chroma; and a noise eliminating portion 123 correcting the lightness, hue or chroma component using the decided noise eliminating filter.

When the scene information is the "backlighted image" or "underexposure image," noise eliminating filter deciding portion 121 applies the noise eliminating filter to the hue and chroma of the image data, whereas it applies no noise eliminating filter to the lightness. Thus, in noise eliminating portion 123, when the scene information is the "backlighted image" or "underexposure image," the noise elimination process is performed on the hue and chroma components, whereas no noise elimination process is performed on the lightness component.

When the scene information is determined as the "sunset image" or "blue sky image," the noise eliminating filter is applied to the lightness, whereas no noise eliminating filter is applied to the hue and chroma. Thus, when the scene information is the "sunset image" or "blue sky image," noise eliminating portion 123 performs the noise elimination process only on the lightness component and performs no noise elimination process on the hue and chroma components.

As such, noise eliminating portion 123 uses the noise eliminating filter applied by noise eliminating filter deciding portion 121 to perform the noise elimination process on the lightness, hue or chroma. If no noise eliminating filter is applied, noise elimination portion 123 performs no noise elimination process.

Color space transformation processing portion 130 transforms the image data from which noise is eliminated in noise elimination processing portion 120 into the image data including the color components of R, G and B, and outputs the transformed image data to image output device 160. Though R, G and B are used here as the color components for transformation, the image data may also be transformed into image data including the color components of C (Cyan), M (Magenta), Y (yellow), and K (black). The CMYK data is desirably output when image output device 160 is a printer. The RGB data is preferably output when image output device 160 is a display.

Figure 3:
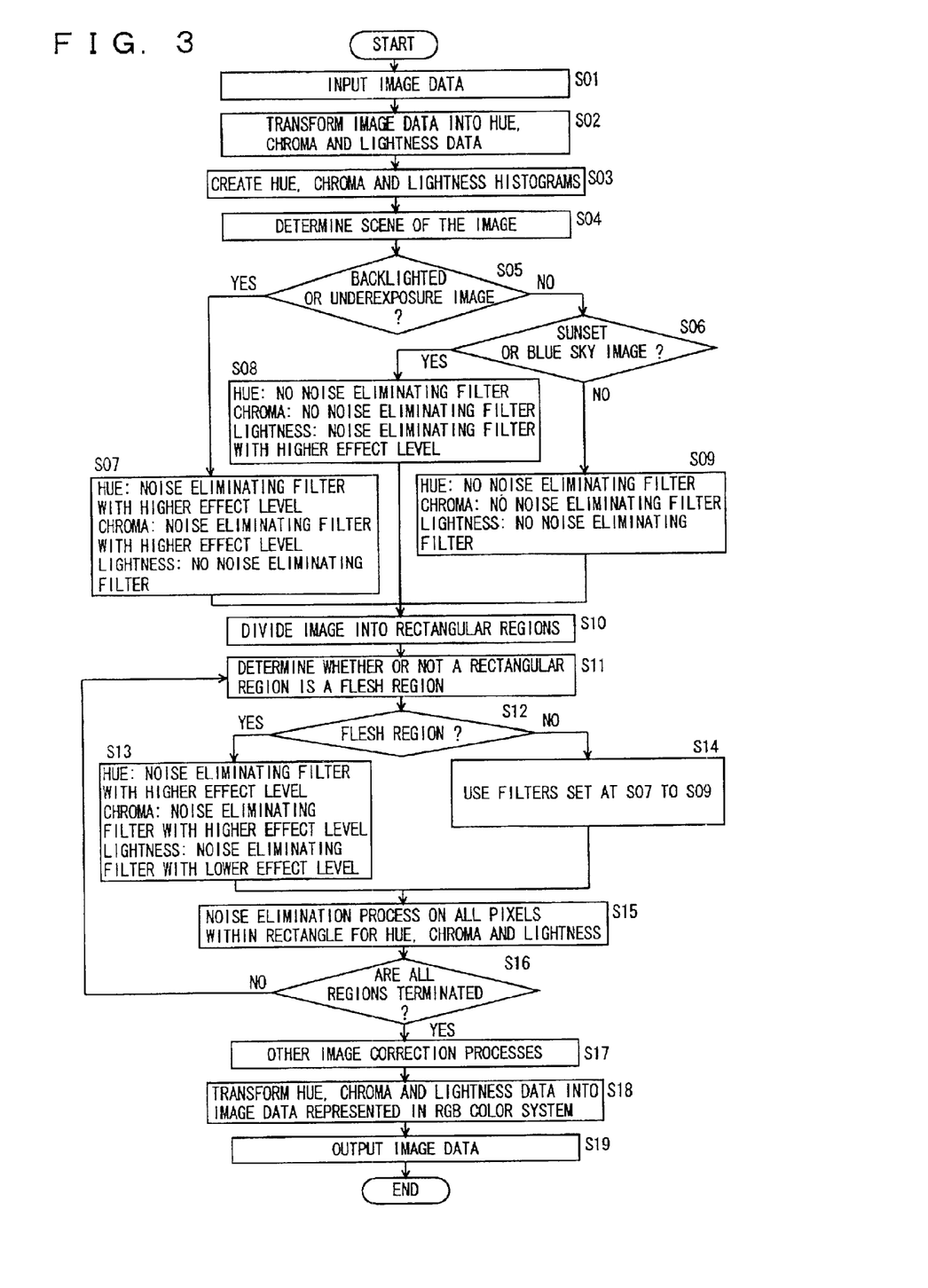
FIG. 3 is a flow chart showing the flow of a noise elimination process performed in the image processing apparatus according to the first embodiment.

FIG. 3 is a flow chart showing the flow of the noise elimination process performed in the image processing apparatus according to the first embodiment. Referring to FIG. 3, in the noise elimination process, first, image data is input from image input device 150 (step S01). The image data that is input here is data including the color components of R, G and B. Then, the input image data is transformed into hue data, chroma data and lightness data (step S02). The transformation can be performed using, for example, a technique described in Japanese Patent Laying-Open No. 9-247473 and U.S. Pat. No. 6,028,957.

The transformed hue data, chroma data and lightness data are used to create the hue histogram, chroma histogram and lightness histogram (step S03).

Furthermore, scene information of the input image is determined from the created three histograms (step S04). The scene information here indicates a scene at which the image is shot, and includes a shooting condition, an object to be shot, and so forth. At step S04, it is determined if the scene information of the input image is any one of the "underexposure image," "sunset image," "backlighted image" and "blue sky image."

Whether or not the scene information corresponds to the "backlighted image" or "underexposure image" is determined based on the lightness histogram created at step S03. When the distribution of the lightness histogram is biased in the low lightness region, the scene information is determined as an underexposure image. Moreover, when the distrubution of the lightness histogram is biased in the low and high lightness regions, it is determined as a backlighted image.

On the other hand, when the distribution of the lightness histogram is biased in the low and high lightness regions and the distribution of the hue histogram is biased toward the red to yellow components, and further when the chroma is high overall in the chroma histogram, the scene information is determined as a "sunset image." Moreover, when the distribution of the hue histogram is biased toward the blue component, the scene information is determined as a "blue sky image."

At step 05, when the scene information of the image is determined as the "backlighted image" or "underexposure image," the process moves on to step 07, and when it is determined otherwise, the process moves on to step S06. At step S06, it is determined if the scene information of the image is the "sunset image" or "blue sky image," and the process moves on to step S08 when true, whereas the process moves on to step S09 when false. At each of steps S07, S08 and S09, a correction level deciding process applying the noise eliminating filter is performed.

The noise eliminating filter includes a noise eliminating filter with a higher effect level and a noise eliminating filter with a lower effect level. There may be the case where no noise filter is applied in the correction level deciding process. Thus, the correction level deciding process is a process deciding one of three correction levels, i.e. a level at which a stronger correction is performed, a level at which a weaker correction is performed, and a level at which no correction is performed. The correction level is decided for each of the lightness, hue and chroma.

At step S07, a noise eliminating filter for stronger noise elimination is applied to each of the hue and chroma, whereas no noise eliminating filter is applied to the lightness.

At step S08, a noise eliminating filter for stronger noise elimination is applied to the lightness, whereas no noise eliminating filter is applied to the hue and chroma.

At step S09, no noise eliminating filter is applied to any of the lightness, hue, and chroma.

At the next step S10, the image is divided into a plurality of rectangular regions, for which the processes from step S11 through step S16 are performed. At step S11, it is determined whether or not a rectangular region is a flesh region. The flesh region means a region including a region in an image in which human flesh is shown. Whether or not the rectangular region is the flesh region is determined by the amount of the pixels of the flesh color, of which the hue falls within the range of a predetermined region (a flesh color region), in the entire rectangular region. If the pixels of the flesh color constitute a high proportion of the pixels included in the rectangular region, the rectangular region is determined as a flesh region.

At step S12, if it is determined as the flesh region based on the determination result from step S11, the process moves on to step S13, and if it is determined otherwise, the process moves on to step S14. At step S13, a noise eliminating filter for performing stronger noise elimination is preferentially applied to each of the hue, chroma and lightness. Here, the noise eliminating filter determined at step S13 is preferentially applied to the rectangular region to be processed, irrespective of the noise eliminating filter applied at step S07, S08 or S09.

On the other hand, at step S14, the noise eliminating filter set at any one of steps S07, S08 and S09 is applied as it is.

At step S15, the noise elimination process is performed on all the pixels in the rectangular region for each of the hue, chroma and lightness. The noise elimination process is performed using the noise elimination filter set at step S07, S08, S09 or S13.

It is then determined whether or not the processes are terminated for all of the rectangular regions (step S16), and if not, the process moves on to step S11 to repeat the processes described above, whereas if terminated, the process moves on to step S17.

At step S17, the other image correction processes are performed. The other image correction processes mean, for example, the process of enhancing the lightness of underexposure image, and the process of enhancing the lightness of a low lightness region of the backlighted image.

At step S18, the image data including the lightness, hue and chroma components is transformed into the image data including the R, G and B components. Then, the transformed image data represented in the RGB color system is output to image output device 160 (step S19).

Figure 4A:
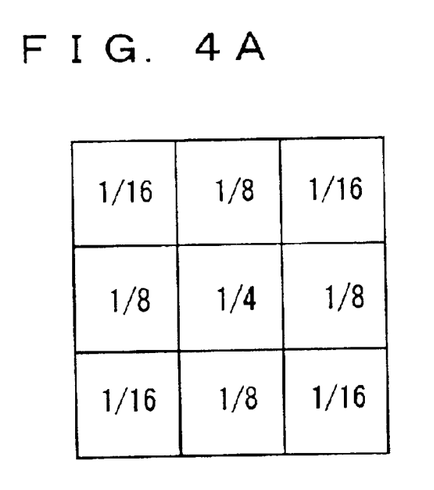
FIGS. 4A and 4B show an example of a smoothing filter as one of a noise elimination filter.
Figure 4B:
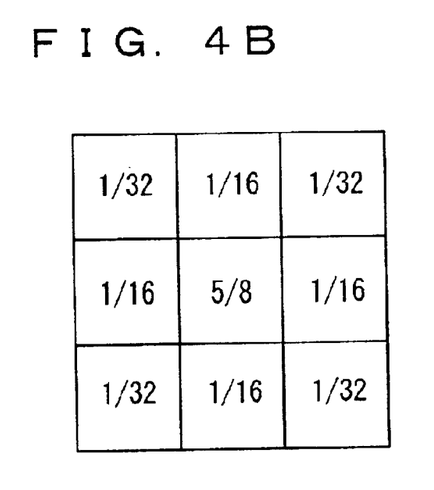

FIGS. 4A and 4B each shows an example of a smoothing filter, which is a kind of the noise eliminating filter. FIG. 4A shows a smoothing filter with a high effect level, whereas FIG. 4B shows a smoothing filter with a low effect level. The smoothing filter with a high effect level corresponds to the noise eliminating filter with higher effect level, whereas the smoothing filter with a low effect level corresponds to the noise eliminating filter with a lower effect level.

As shown in FIGS. 4A and 4B, when the smoothing filter with high effect level is used, the rate at which the value of a pixel of interest is interpolated by the values of the adjacent pixels is high, whereas, when the smoothing filter with low effect level is used, the rate at which the value of a pixel of interest is interpolated by the values of the adjacent pixels is low.

The smoothing filter is a noise eliminating filter used in the process for the lightness and chroma components at noise eliminating filter deciding portion 121. For the noise eliminating filter used for the hue component, a median filter or a mode filter is used in the present embodiment. The median filter is a filter for performing a process of sorting reference pixels in the filter in the ascending (or descending) order and replacing the median value thereof by a corrected new value.

The mode filter is for creating a histogram based on the reference pixels in the filter and setting the mode value thereof as a corrected new value. However, the mode filter used in the present embodiment is as large as 3×3 pixels, 5×5 pixels or the like, so that the number of pixels processed in the filter is extremely small compared to the range of the value that can be taken by the hue component (0 to 255). Thus, the mode filter cannot be simply used. Therefore, in the present embodiment, the range of the value of the hue component (0 to 255) is pre-divided into four stages. The four stages includes the first stage ranging from 0 to 63, the second stage ranging from 64 to 127, the third stage ranging from 128 to 191, and the fourth stage ranging from 192 to 255. The reference pixels are classified into four stages described above, and are counted in each stage. Then, the mean of the hue component of the reference pixels corresponding to the most frequent stage is obtained. This prevents occurrence of extremely undesired hue. Here, the number of divisions of the hue component is not limited to 4, but may be larger for a more precise process.

Moreover, the filter used in the noise elimination process is not limited to have the size of 3×3 pixels, but may have any size. Furthermore, it is unnecessary to perform the same process on the chroma component and on the lightness component. For example, a stronger noise elimination process may be performed on the chroma component compared to that performed on the lightness component, since the visual sense of human is not so sensitive to the change in chroma compared to the change in lightness.

Figure 5:
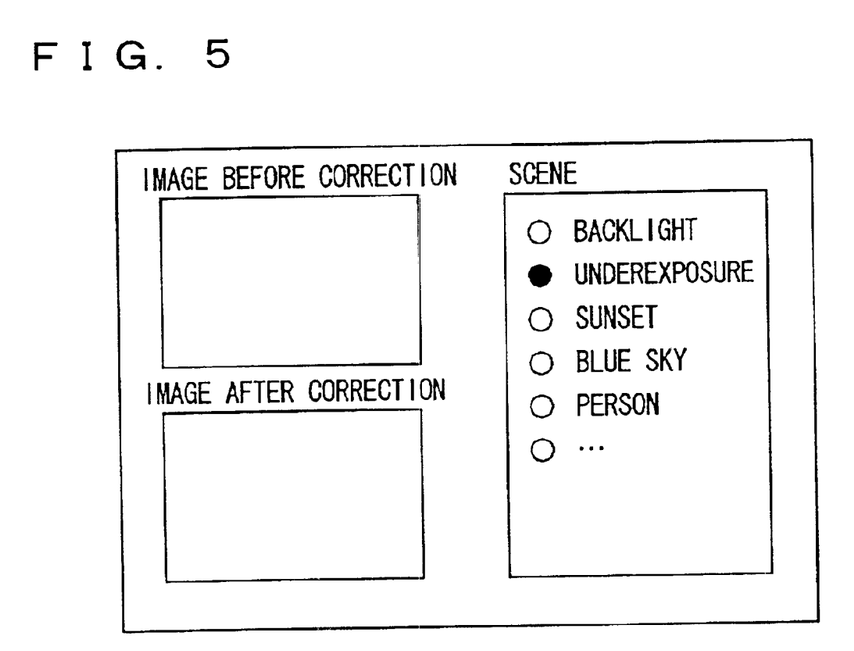
FIG. 5 shows an example of a graphical user interface for entering the character of an image.

In the present embodiment, though the character of the image data is automatically determined at scene determination processing portion 110, scene information may also be entered from a keyboard, mouse or the like of image processing apparatus 100 by the user. FIG. 5 shows an example of a graphical user interface (GUI) for entering scene information of an image. Referring to FIG. 5, in the column of scene selecting, the scene information such as backlight, underexposure, sunset, blue sky, person, and so forth are exemplified. The scene information is entered by marking off the check circle provided corresponding to the exemplified scene information, using a pointing device of a mouse or the like.

The image before the noise elimination process is displayed in the region of "image before correction," and the image after the noise elimination process is displayed in the region of "image after correction." The user can view how the correction is made to the image, by selecting each of the scene information.

As has been described above, in image processing apparatus 100 according to the first embodiment, the noise elimination process, which is different for each of the lightness, chroma and hue is performed on the input image in the uniform color space having the lightness, chroma and hue as components. This allows appropriate correction according to the character of the image. As a result, the image can be prevented from being blurred due to the correction while gradation of the image is maintained, and therefore an appropriate noise elimination process can be performed.

In addition, whether or not the noise elimination is performed on the lightness, hue and chroma components is decided in accordance with the character of the image. If the noise elimination is performed, a noise eliminating filter to be used is applied, so that the noise elimination according to the character of the image can be performed.

Moreover, if there is no need for the noise elimination process, noise elimination processing portion 120 of image processing apparatus 100 applies no noise eliminating filter. Thus, the image remains uncorrected when no noise elimination is required, preventing unnecessary correction.

Furthermore, the uniform color space into which the image is transformed by color space transformation processing portion 101 of image processing apparatus 100 has lightness, chroma and hue components, and scene determination processing portion 110 determines scene information based on color signals of the lightness, chroma and/or hue of the transformed image. This allows correction for eliminating the noise visible when the process of correcting the lightness of the image is performed, or correction for eliminating the noise from the image including the same hue by a large amount. Moreover, the scene information indicating the character of the image can be determined based on the lightness, hue or chroma, so that the scene information can be determined in detail, allowing appropriate elimination of the noise.

In addition, scene determination processing portion 101 of image processing apparatus 100 includes an accepting portion accepting the input of the scene information, so that the scene information can be determined at the will of an operator of image processing apparatus 100.

Furthermore, the uniform color space into which the received image is transformed by color space transformation processing portion 101 of image processing apparatus 100 has at least the hue as a component, and noise elimination processing portion 120 corrects the color signals of the hue using the median filter or mode filter. Even if there are adjacent pixels that have hues greatly different from each other, no neutral color of the two hues occurs. Therefore, the image can appropriately be corrected.

Second Embodiment

Figure 6:
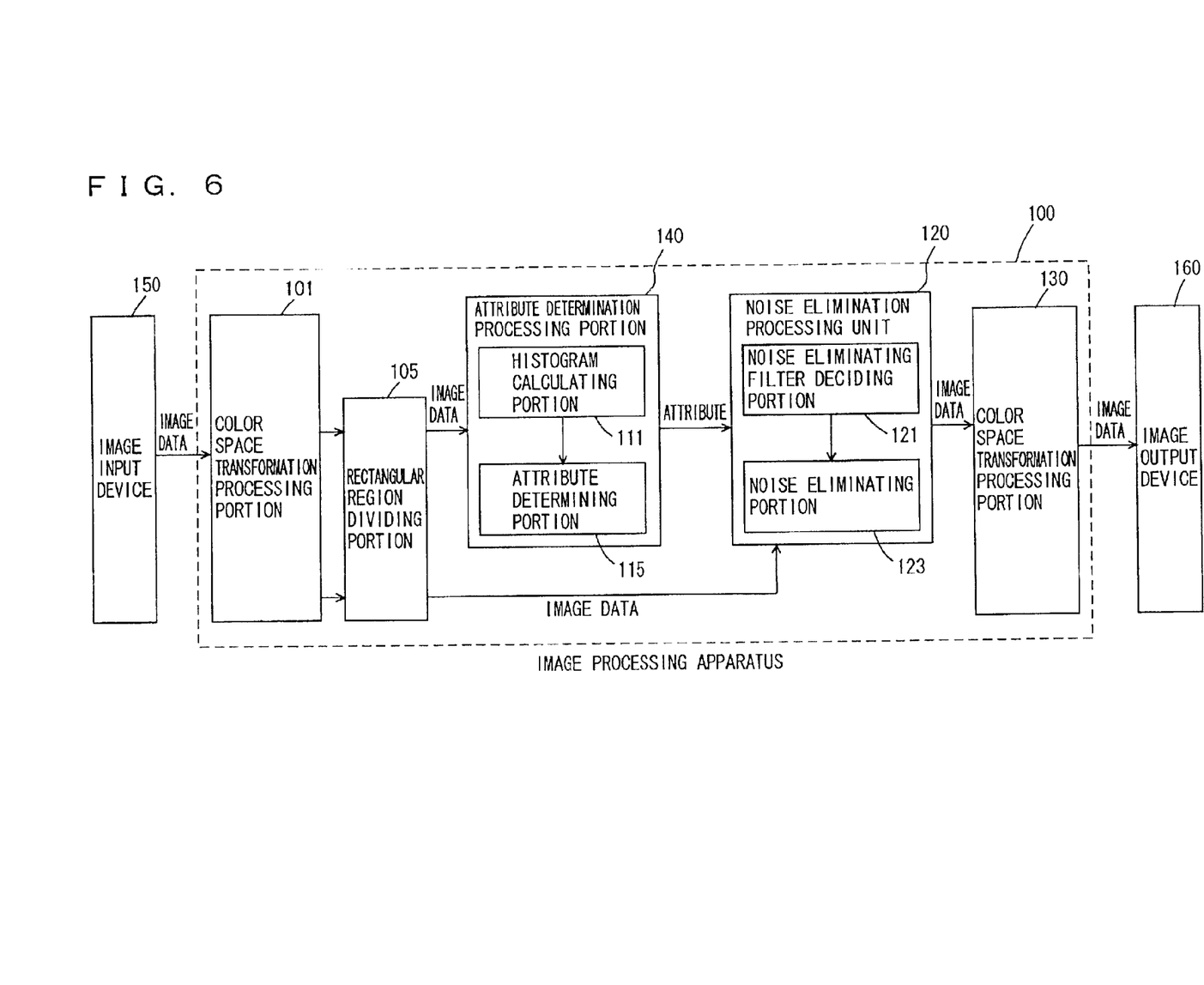
FIG. 6 is a functional block diagram schematically showing the function of an image processing apparatus according to the second embodiment.

An image processing apparatus according to the second embodiment will now be described. FIG. 6 is a block diagram showing the schematic configuration of the function of the image processing apparatus according to the second embodiment. The image processing apparatus according to the second embodiment has a configuration in that, in addition to the configuration of the image processing apparatus according to the first embodiment, a rectangular region dividing portion 105 is added and scene determination processing portion 110 is replaced by an attribute determination processing portion 140. Here, the portions different from those of the first embodiments are described, and the description will not be repeated for the overlapped portions.

Rectangular region dividing portion 105 divides the image data transformed at color space transformation processing portion 101 into a plurality of rectangular regions. A rectangular region is a region of a rectangle having the size of 3×3 pixels. Though the size of the rectangular region is set as 3×3 pixels in the present embodiment, it is not limited thereto, and 8×8 pixels, 16×16 pixels or the like may also be used. The size of the rectangular region may be determined in accordance with the size of a shot image or processing speed.

Then, image data is transmitted to attribute determination processing portion 140 and noise elimination processing portion 120, for each of the divided rectangular regions. Attribute determination processing portion 140 and noise elimination processing portion 120 respectively perform an attribute determination process and a noise elimination process for each of the transmitted rectangular regions.

Attribute determination processing portion 140 includes a histogram calculating portion 111 calculating a histogram for each of lightness, hue and chroma, and an attribute determining portion 115 determining an attribute of a rectangular region input from image input device 150. Histogram calculating portion 111 creates a histogram for each of the lightness, hue and chroma components, based on the image data transformed at color space transformation processing portion 101.

Attribute determining portion 115 determines an attribute of a rectangular region based on the three histograms created at histogram calculating portion 111. The attribute determined by attribute determining portion 115 is transmitted to noise elimination processing portion 120.

The attribute of the rectangular region indicates a "flesh region," "dark region" or "solid region." The flesh region means a region including a region in the image in which human flesh is shown. Whether or not the rectangular region is a flesh region is determined by the amount of pixels of the flesh color, of which the hue falls within the range of a predetermined region (a region of the flesh color), in the rectangular region. When the pixels of the flesh color constitute a high proportion of the pixels included in the rectangular region so that the amount of the flesh color pixels exceeds a predetermined value, it is determined that the rectangular region is a flesh region.

The dark region means a region mainly having low lightness, and for example, corresponds to the region having lightness lower than that of the other regions in the image shot in the backlight. If the mean value of lightness in the pixels included in a rectangular region is lower than a predetermined value, it is determined that the rectangular region is a dark region.

The solid region is a region mainly including pixels of the same hue, and is included, e.g. in an image obtained by shooting a blue sky. When the hue of the pixels included in a rectangular region is biased in a predetermined range, it is determined that the rectangular region is a solid region.

Figure 7:
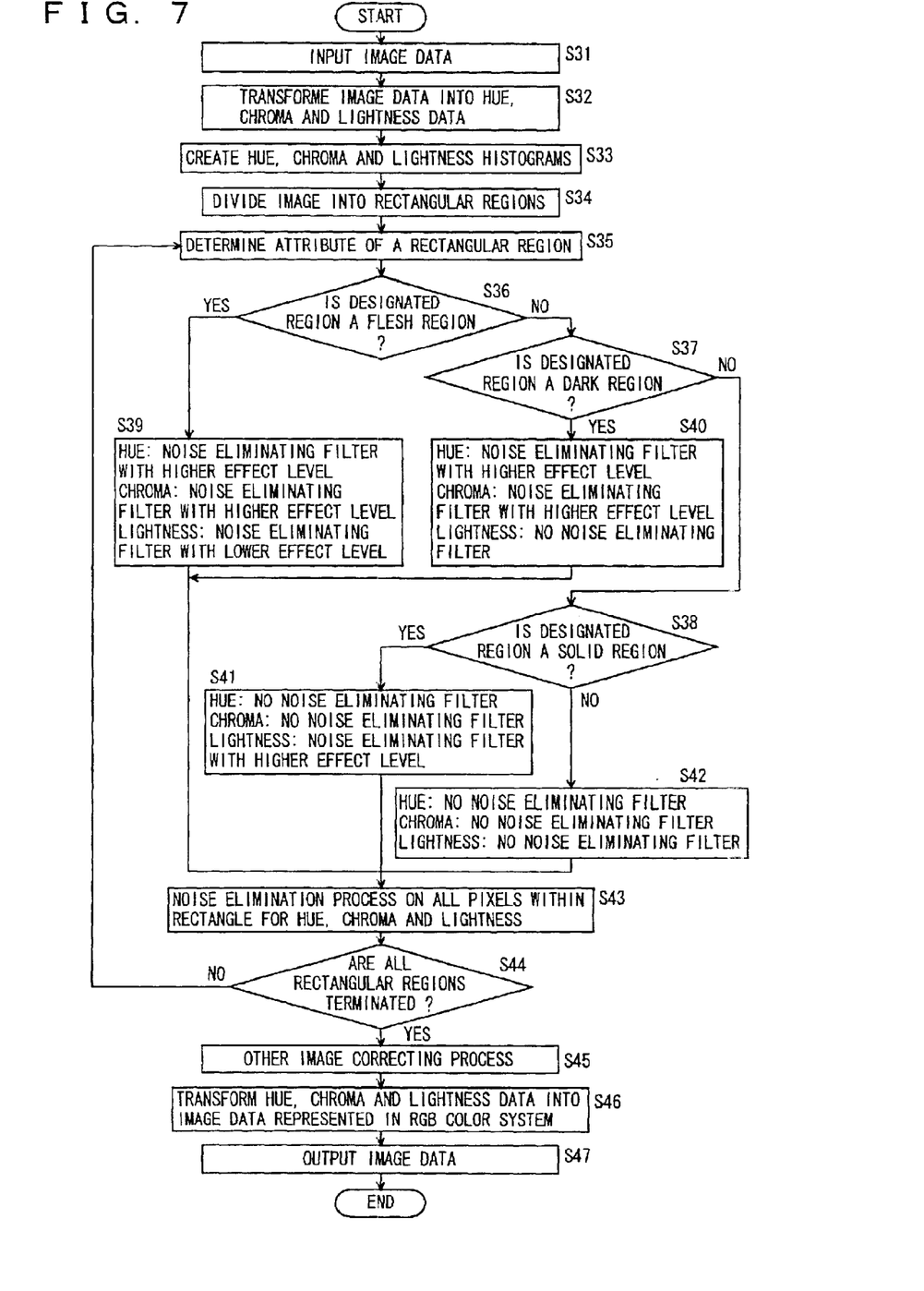
FIG. 7 is a flow chart showing the flow of a noise elimination process performed in the image processing apparatus according to the second embodiment.

FIG. 7 is a flow chart showing the flow of the noise eliminating process performed in the image processing apparatus according to the second embodiment. Referring to FIG. 7, in the noise eliminating process, first, the image data including the color components of R, G and B is input (step S31). Thereafter, the input image data is transformed into color signals of the uniform color space having lightness, hue and chroma as components (step S32). Then, a histogram is created for each of the lightness, hue and chroma components (step S33). Each histogram has a horizontal axis as the lightness, hue or chroma, and a vertical axis as the number of pixels.

At step S34, the image data is divided into a plurality of rectangular regions. An attribute is then determined for each of the divided rectangular regions (step S35). In the determination of attribute, it is determined if the divided rectangular region is a flesh region, a dark region or a solid region.

After the attribute is determined for the rectangular regions, it is determined whether or not the attribute of a designated region is a flesh region (step S36). If it is determined as the flesh region, the process moves on to step S39, and if it is determined otherwise, the process moves on to step S37. The designated region is a rectangular region that was an object for determining its attribute, and the attribute of the designated region had determined prior to step S36.

At step S37, it is determined whether or not the attribute of the designated region is a dark region. If it is the dark region, the process moves on to step S40, and if it is otherwise, the process moves on to step S38. At step S38, it is determined whether or not the attribute of the designated region is a solid region. If it is determined as the solid region, the process moves on to step S41, and if it is determined otherwise, the process moves on to step S42.

At steps S39 through S42, a correction level deciding process applying a noise eliminating filter to each of the lightness, hue and chroma. The noise eliminating filter includes a noise eliminating filter with a higher effect level and a noise eliminating filter with a lower effect level. In the correction level deciding process, there may be the case where no noise eliminating filter is applied. Therefore, the correction level deciding process is a process of deciding a correction level from the three correction levels, i.e. a level at which stronger correction is performed, a level at which weaker correction is performed, and a level at which no correction is performed. The correction level is decided for each of the lightness, hue and chroma.

At step S39, since the attribute of the designated region has been determined as the flesh region, a noise filter with a high effect level is applied to each of the hue and chroma for performing a stronger noise eliminating process, whereas a noise filter with a low effect level is applied to the lightness.

At step S40, since the attribute of the designated region has been determined as the dark region, a noise eliminating filter with a high effect level is applied to each of the hue and chroma, whereas no noise eliminating filter is applied to the lightness.

At step S41, since the attribute of the designated region has been determined as the solid region, a noise eliminating filter with a high effect level is applied to the lightness, whereas no noise eliminating filter is applied to the hue and chroma.

At step S42, since the attribute of the rectangular region corresponds to none of the flesh region, dark region and solid region, no noise eliminating filter is applied to any of the lightness, hue and chroma in such a case.

At step S43, a noise elimination process is performed on all the pixels within the designated region, using the noise eliminating filter applied at any one of the steps S39 through S42. The noise elimination process is performed separately for each of the lightness, hue and chroma. However, no noise elimination process is performed on the lightness, hue and chroma to which no noise eliminating filter is applied.

Subsequently, at step S44, it is determined whether or not the processes have been terminated for all the rectangular regions, and if terminated, the process moves on to step S45. If the processes have not been terminated, the process goes back to step S35, to repeat the processes described above.

At step S45, the other image correction processes, for example, a correction process for enhancing the lightness of a low lightness region in a backlighted image, and a correction process for wholly enhancing the lightness of an underexposure image, are performed.

Thereafter, at step S46, the image data represented by the lightness, hue and chroma components are transformed into the image data represented in the RGB color system. The image data represented in the RGB color system is output to image output device 160 (step S47).

As has been described above, the image processing apparatus according to the present embodiment applies a different noise filter to each of the lightness, hue and chroma components of an input image in accordance with the character of the image, so that a noise elimination process suitable for the visual sense of human can be provided without occurrence of unwanted color or unnatural noise.

Moreover, image processing apparatus 100 divides the image into a plurality of rectangular regions at rectangular region dividing portion 105; detects a specified rectangular region including a specific hue (flesh region, dark region and solid region) from the plurality of rectangular regions, based on a transformed color signal; and decides a specific correction level to the detected specified rectangular region at noise elimination processing portion 120. Thus, a specific correction process can be performed only on the specified rectangular region including the specific hue. The specific hue may include, for example, the color of human flesh. When the specific hue is set as the flesh color, correction for noise elimination can be performed only on the region of human flesh.

Furthermore, in image processing apparatus 100, a noise elimination process which is different for each of the lightness, chroma and hue is performed on the input image in the uniform color space having the light, chroma and hue as components. Thus, appropriate correction is performed according to the character of the image. As a result, the image can be prevented from being blurred due to correction while gradation of the image is maintained, and thus an appropriate noise elimination process can be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   a receiver for receiving an image obtained by shooting a subject;
   a transforming portion for transforming said received image into a color signal represented in a uniform color space;
   a determining portion for determining scene information indicating a character of said received image;
   a deciding portion for deciding a correction level for correcting said image in accordance with said determined scene information; and
   a correcting portion for correcting said image in said uniform color space in accordance with said decided correction level.

2. The image processing apparatus according to claim 1, wherein
   said uniform color space has components of lightness, hue and chroma, and
   said deciding portion decides said correction level for each of the lightness, hue and chroma of said transformed image.

3. The image processing apparatus according to claim 1, wherein said correction level decided by said deciding portion includes a level at which no correction is made.

4. The image processing apparatus according to claim 1, wherein
   said uniform color space has components of lightness, chroma and hue, and
   said determining portion determines scene information based on a color signal having at least one of the lightness, chroma and hue of said transformed image.

5. The image processing apparatus according to claim 1, wherein said determining portion includes an accepting portion for accepting an input of scene information.

6. The image processing apparatus according to claim 1, wherein
   said uniform color space has at least a hue as a component, and
   said correcting portion corrects a color signal of a hue using one of a median filter and a mode filter.

7. The image processing apparatus according to claim 1, further comprising:
   a dividing portion for dividing said received image into a plurality of rectangular regions; and
   a detecting portion for detecting a specified rectangular region including a specific hue from said plurality of rectangular regions, based on said transformed color signal;
   said deciding portion for deciding a specific correction level for said detected specified rectangular region.

8. An image processing apparatus, comprising:
   a receiver for receiving an image obtained by shooting a subject;
   a dividing portion for dividing said received image into a plurality of rectangular regions;
   a transforming portion for transforming said received image into a color signal represented in a uniform color space;
   a detecting portion for detecting an attribute of each of said plurality of rectangular regions based on said transformed color signals;
   a deciding portion for deciding a correction level for each of said rectangular regions in accordance with said detected attribute; and
   a correcting portion for correcting said received image for each of said rectangular regions in said uniform color space, in accordance with said decided correction level.

9. The image processing apparatus according to claim 8, wherein
   said uniform color space has components of lightness, hue and chroma, and
   said deciding portion decides said correction level for each of the lightness, hue and chroma of said transformed image.

10. An image processing method, comprising the steps of:
    receiving an image obtained by shooting a subject;
    transforming said received image into a color signal represented in a uniform color space;
    determining scene information indicating a character of said received image;
    deciding a correction level for correcting said image in accordance with said determined scene information; and
    correcting said image in said uniform color space in accordance with said decided correction level.

11. A computer program embodied in a computer readable medium for performing the steps of:
    receiving an image obtained by shooting a subject;
    transforming said received image into a color signal represented in a uniform color space;
    determining scene information indicating a character of said received image;

deciding a correction level for correcting said image in accordance with said determined scene information; and correcting said image in said uniform color space in accordance with said decided correction level.

12. A computer program embodied in a computer readable medium for performing the steps of:

receiving an image obtained by shooting a subject;

dividing said received image into a plurality of rectangular regions;

transforming said received image into a color signal represented in a uniform color space;

detecting an attribute of each of said plurality of rectangular regions based on said transformed color signal;

deciding a correction level for each of said rectangular regions in accordance with said detected attribute; and correcting said received image for each of said rectangular regions in said uniform color space in accordance with said decided correction level.

13. A computer program embodied in a computer readable medium for performing the steps of:

receiving an image obtained by shooting a subject;

transforming said received image into a color signal represented in a uniform color space;

determining scene information indicating a character of said received image;

deciding process details for correcting said image in accordance with said determined scene information; and correcting said image in said uniform color space in accordance with said decided process details.

* * * * *